US012530371B1

(12) United States Patent
Rao et al.

(10) Patent No.: US 12,530,371 B1
(45) Date of Patent: Jan. 20, 2026

(54) DATA INGESTION UTILIZING A COORDINATOR AND CONNECTORS

(71) Applicant: Dropbox, Inc., San Francisco, CA (US)

(72) Inventors: Aniruddh Rao, Sammamish, WA (US); Ryan Morlok, Inver Grove Heights, MN (US); Jason Terk, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

(21) Appl. No.: 18/776,830

(22) Filed: Jul. 18, 2024

(51) Int. Cl.
*G06F 15/16* (2006.01)
*G06F 16/25* (2019.01)
*G06F 16/27* (2019.01)

(52) U.S. Cl.
CPC ............ *G06F 16/27* (2019.01); *G06F 16/254* (2019.01)

(58) Field of Classification Search
None
See application file for complete search history.

(56) References Cited

U.S. PATENT DOCUMENTS

| | | | |
|---|---|---|---|
| 8,799,535 B2 | 8/2014 | Hluchyj et al. | |
| 10,122,783 B2 | 11/2018 | Qiao et al. | |
| 11,297,147 B2 | 4/2022 | Wang et al. | |
| 11,575,674 B2 | 2/2023 | Bourgeois et al. | |
| 12,066,981 B1 * | 8/2024 | Bansal | G06F 16/1748 |
| 2007/0174541 A1 * | 7/2007 | Chandrasekaran | G06F 12/0866 711/E12.027 |
| 2014/0229480 A1 * | 8/2014 | Buxbaum | G06F 16/254 707/736 |
| 2020/0300640 A1 * | 9/2020 | Hong | G01C 21/3889 |
| 2021/0303594 A1 * | 9/2021 | Puvvada | H04L 47/122 |
| 2021/0373971 A1 * | 12/2021 | Lu | G06F 9/5077 |
| 2022/0027379 A1 | 1/2022 | Unterbrunner et al. | |
| 2023/0259521 A1 | 8/2023 | Haelen et al. | |

(Continued)

FOREIGN PATENT DOCUMENTS

WO 2023097270 A1 6/2023

OTHER PUBLICATIONS

Andreakis A., et al., "DBLog: A Watermark Based Change-Data-Capture Framework," arXiv:2010.12597v1 [cs.DB], Oct. 23, 2020, 6 pages, Retrieved from the Internet: URL: https://arxiv.org/abs/2010.12597.

(Continued)

*Primary Examiner* — Alex Gofman
(74) *Attorney, Agent, or Firm* — Keller Preece PLLC

(57) ABSTRACT

The present disclosure relates to systems, non-transitory computer-readable media, and methods for ingesting a dataset from a computer application that is external to a content management system. In particular, the disclosed systems can perform an ingestion process comprising a plurality of transfer runs by linking a content management system to the computer application with a connector. The disclosed systems can utilize a coordinator with computer logic to control the connector to determine a cursor location within a page of data at a failure point during a first transfer run. Moreover, the disclosed systems can store a subset of data from the page that comes after the cursor location and ingest the subset of data from the object queue by continuing the ingestion process according to the cursor location at the failure point of the first transfer run.

20 Claims, 7 Drawing Sheets

(56) References Cited

U.S. PATENT DOCUMENTS

2024/0126700 A1    4/2024    Hibser et al.

OTHER PUBLICATIONS

Kalogerakis S., et al., "Discovery of Breakout Patterns in Financial Tick Data via Parallel Stream Processing with in-order Guarantees," Proceedings of the 17th ACM International Conference on Distributed and Event-based Systems (DEBS), Jun. 27-30, 2023, pp. 115-126, Retrieved from the Internet: URL: https://dl.acm.org/doi/10.1145/3583678.3596897.

Microsoft Learn, "Incrementally Load Data from Azure SQL Database to Azure Blob Storage Using the Azure Portal," Microsoft Learn Article, May 15, 2024 [Retrieved on May 27, 2024], 16 pages, Retrieved from the Internet: URL: https://learn.microsoft.com/en-us/azure/data-factory/tutorial-incremental-copy-portal.

\* cited by examiner

DATA INGESTION UTILIZING A COORDINATOR AND CONNECTORS

BACKGROUND

Recent years have seen significant development in accessing, transferring, and storing information from third-party sources to internal data systems. Indeed, the increased popularity of ingesting data from computer applications and/or third-party systems has led to systems utilizing asynchronous methods for accessing, downloading, and synchronizing information from such third-party systems. For example, some existing systems utilize workflows in the form of connectors and a coordinator that implement logic to ingest, transform, monitor, and/or synchronize large sets of data from the computer application and/or third-party system to an internal data system.

In some instances, while ingesting data, existing systems utilize watermarking (a form of checkpointing) as a way to establish which data from the computer application and/or third-party system has been processed and transferred to the internal data system. In particular, existing systems download one or more pages of data, identify watermarks in the pages of data, and utilize the watermarks as points of reference for ingesting subsequent pages of data. For example, some conventional systems will begin downloading a page of data but fall short of processing the entire page due to system parameters. When some conventional systems re-start data ingestion they use the watermark as a starting point indicating where to continue data ingestion. Despite these advances, some existing systems exhibit a number of problems in relation to efficiency and accuracy while ingesting and processing data from third-party sources.

As just mentioned, many existing data ingestion systems are inaccurate when ingesting data from third-party sources. Specifically, existing data ingestion systems are unable to accurately track the status of data items during data ingestion. For example, as discussed above, existing data ingestion systems utilize watermarks to track the ingestion status of data items while downloading data from a third-party system to an internal data system. However, some existing data ingestion systems lose track of the data. For example, some existing systems will begin downloading a first page of data, and due to system parameters, fall short of processing the entire first page. In such instances, these existing systems will either try to capture all of the data in the first page by re-processing the page or jump ahead to a watermark on a second page and begin ingesting data in the subsequent page while skipping or dropping unprocessed data in the first page. Such schemes result in some existing systems sending incomplete and inaccurate data to internal data systems. Thus, some existing systems process data items in an inaccurate and unreliable manner.

On top of inaccuracy issues, some conventional systems are inefficient. As mentioned above, some existing systems lose track of the processing status of data items. When existing systems lose track of the processing status of data items, they start the entire ingestion process over again and waste computational resources on reprocessing data items. Relatedly, in some cases, when ingesting large pages of data, some existing systems can get stuck in a loop reprocessing the same large file multiple times because they cannot determine if they fully ingested the data in the large page of data.

SUMMARY

One or more embodiments described herein provide benefits and/or solve one or more problems in the art with systems, methods, and non-transitory computer readable storage media that utilize a coordinator and corresponding connectors to transfer and ingest data from a computer application that is external to a content management system. In one or more embodiments, the sync coordination system ingests a dataset from the computer application by pulling, processing, and sending pages of data that make up the dataset to a data pipeline. In some implementations, the sync coordination system pulls and processes one page from the one or more pages of data by processing and ingesting data from the page of data during a transfer run.

However, in some cases the sync coordination system does not fully process and/or send all of the data from the page of data during the transfer run because the sync coordination system encounters a failure point. In one or more embodiments, when encountering the failure point, the sync coordination system can determine a cursor location indicating where the sync coordination system stopped processing the data from the page of data during the transfer run.

In some cases, the sync coordination system can send and store a subset of data (e.g., remaining unprocessed data) from the page of data that comes after the cursor location to an object queue. In a later transfer run, the sync coordination system can utilize the cursor location to continue the ingestion process by processing the subset of data based on the failure point of the transfer run.

BRIEF DESCRIPTION OF THE DRAWINGS

This disclosure will describe one or more embodiments of the invention with additional specificity and detail by referencing the accompanying figures. The following paragraphs briefly describe those figures, in which.

DETAILED DESCRIPTION

Figure 1:
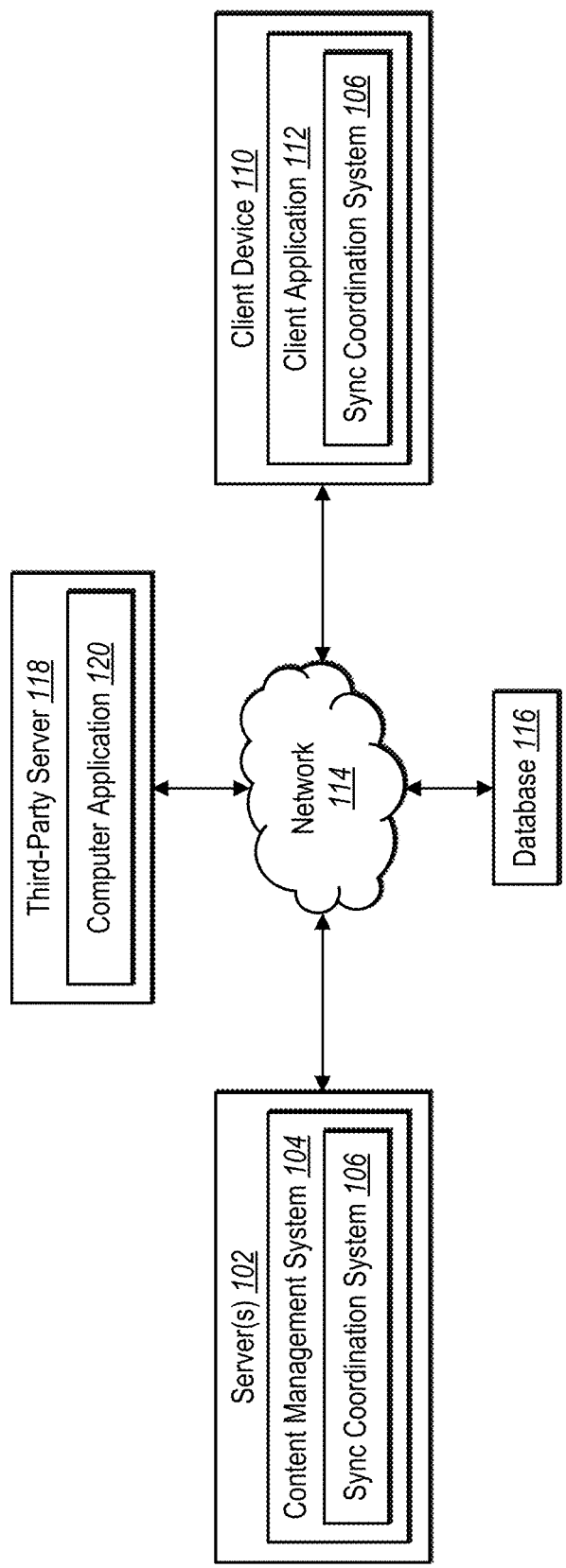
FIG. 1 illustrates an example environment within which a sync coordination system can operate in accordance with one or more embodiments.

This disclosure describes embodiments of a sync coordination system that can ingest data from a computer application that is external to a content management system by utilizing watermarking-a form of checkpointing—to record the saved progress of ingesting a dataset. Indeed, the sync coordination system can start an ingestion process to obtain a dataset from the computer application by linking the content management system to the computer application through a connector during one or more transfer runs. In some cases, the sync coordination system can determine, by utilizing a coordinator that can control the connector, a cursor location within a page of data by encountering a failure point during a first transfer run. In some embodiments, the sync coordination system can designate the cursor location of the page of data at the failure point of the first transfer run. In some embodiments, the sync coordination system can store a subset of data that comes after the cursor location in an object queue. In one or more implementations, the sync coordination system can continue the ingestion process by ingesting, from the object queue, the subset of data during a second transfer run according to the cursor location.

As just mentioned, the sync coordination system can perform an ingestion process by linking the content management system to a computer application external to the content management system. In some cases, the computer application is a third-party service (e.g., third-party API) that, when requested, provides the dataset as one or more pages of data. In one or more embodiments, the sync coordination system can call into the computer application by utilizing a connector. Indeed, the sync coordination system, via the connector, can pull, sync, and/or discover a page of data from the one or more pages of data from the computer application. In some cases, the sync coordination system can perform the ingestion process by implementing one or more transfer runs.

In one or more implementations, during the ingestion process, the sync coordination system can determine a cursor location within the page of the one or more pages of data based on a failure point during the first transfer run. In particular, the sync coordination system can utilize a coordinator along with the connector to identify the failure point and designate within the page the position of the cursor location according to the failure point of the first transfer run. In some cases, while ingesting the page from the one or more pages of data, the sync coordination system will not process all of the data within the page of data. Relatedly, in one or more embodiments, the point where the sync coordination system fails to process the entirety of the page of data is the failure point. In some cases, the sync coordination system can utilize the coordinator and connector to identify the failure point by tracking which data items the sync coordination system processed from the page of data. Relatedly, the sync coordination system can determine the cursor location by setting the cursor location at the failure point of the first transfer run.

Additionally, in some implementations, the sync coordination system can store a subset of data (e.g., unprocessed data) from the page in an object queue. In some cases, the subset of data can be data included in the page of data that follows the cursor location. For example, the sync coordination system can track the processing status of the data from the page of data and based on whether the data from the page of data is pending, the sync coordination system can store the pending data (e.g. subset of data) in the object queue.

Moreover, in one or more embodiments, the sync coordination system can continue the ingestion process by ingesting the subset of data during a subsequent transfer run. In particular, the sync coordination system can pull the subset of data from the object queue and process the subset of data (e.g., pending data) during a second transfer run. In some embodiments, the sync coordination system can process the subset of data according to the cursor location at the failure point of the first transfer run.

As suggested above, through one or more of the embodiments mentioned above (as described in further detail below), the sync coordination system can provide several improvements or advantages over existing data ingestion systems. For example, the sync coordination system can improve accuracy compared to prior systems. While many prior systems drop data during data ingestion by losing track of data in the ingestion process, the sync coordination system does not drop data during data ingestion by storing unprocessed data in an object queue and utilizing a cursor location to process the unprocessed data in a subsequent transfer run. Additionally, the sync coordination system does not update the water mark (e.g., cursor location) without ensuring that the data in the page of data is sent to the data pipeline and/or sent to the object queue. Indeed, unlike existing systems, the sync coordination system can track and monitor the status and location of all of the data in a page of data during data ingestion.

Moreover, the sync coordination system improves efficiency over existing systems. For example, some existing systems utilize a coordinator and one or more connectors to access and ingest a dataset comprising one or more pages of data. In some cases, the connectors (e.g., workflows) of existing systems comprise complex logic that manages and tracks the progress of ingesting and processing the pages of data while keeping the coordinator in the dark about the ingestion status of the one or more pages of data. Indeed, existing systems utilizing this complex arrangement can lose track of data during a processing interval and waste computational resources by reprocessing pages of data while trying to fully collect and process data from a page of data because the coordinator is unaware of the status of logic being implemented by the connectors. Unlike such systems, the sync coordination system simplifies connectors by housing less logic in the connector. Indeed, simplifying the computer logic in the connectors and centralizing the computer logic in the coordinator allows the sync coordination system to use fewer computational resources during data ingestion. For example, the sync coordination system does not waste computational resources during data ingestion because it does not have to reprocess an entire page of data. Indeed, the sync coordination system can track the status of each item of data in the page of data and determine when to update a cursor location (e.g., watermark), purge data, stop processing data, and implement data ingestion across multiple connectors in parallel. Thus, by utilizing the coordinator to determine when to invoke computer logic, the sync coordination system does not needlessly utilize computing resources to implement the computer logic for each connector.

Relatedly, due to simplifying the logic of the connectors and centralizing the logic in the coordinator, the sync coordination system can utilize more connectors in parallel and accurately download datasets more quickly. For example, based on the complexity of connectors, existing systems are limited in the number of connectors that they can utilize during data ingestion because implementing several logic heavy connectors requires an inordinate amount of computing resources. Unlike such existing systems, the sync coordination system can utilize any number of connectors because the sync coordination system utilizes fewer computing resources while implementing the several connectors with simplified logic.

As illustrated by the foregoing discussion, the present disclosure utilizes a variety of terms to describe features and benefits of the sync coordination system. Additional detail is hereafter provided regarding the meaning of these terms as used in this disclosure. As used herein, the term "coordinator" refers to a data structure, logic, code, and/or software that coordinates the ingestion of datasets across one or more connectors. For instance, the coordinator can include computer logic that determines the cursor location, manages the purging of data, ensures compliance with stop controls, and controls looping through pages of data across one or more connectors. For example, the sync coordination system can cause the coordinator to invoke one or more functions provided by the connectors to advance the ingestion process of data from a computer application that is external to the content management system. Moreover, the coordinator can track the location, status, and/or progress of ingesting data from the dataset. For example, the coordinator can identify the progress of a dataset by tracking the flow of the dataset through various channels or detecting the presence of data in the object queue.

As used herein, the term "connector" refers to a data structure, logic, code, and/or software that communicates with and pulls data from a third-party server or computer application that is external to the content management system. In some cases, a connector can utilize (or include) computer logic to provide certain functions to the coordinator that enables preparation of the data for further downstream use. For example, the coordinator can receive functions from the connector and invoke those functions to discover data, transform data, and generate operation packets (e.g., standardizations) of the data so that the coordinator can send the data to a data pipeline for further downstream systems to consume. For example, in some cases, a connector can include logic that pulls one page of data from a third-party server and sends a cursor location within the page of data and/or new cursor location within a following page of data to the coordinator. Moreover, in some instances, the connector can provide to the coordinator a function to transform data and/or generate an operation packet to send to the data pipeline. In some cases, a connector can have a specific connector type. For example, the connector type can be based on the third-party system. Additionally, in one or more embodiments, the connector can include logic specific to an external computer application (e.g., third-party system). Indeed, the coordinator can be agnostic to the third-party system.

Moreover, as used herein, the term "dataset" refers to a collection of data. In some embodiments, a dataset can include, but is not limited to, files, objects and/or items of images, charts, videos, audio, web links, tables, webpage, or website. In some cases, a computer application external to a content management system houses the dataset. Moreover, in one or more embodiments, the dataset can comprise one or more pages of data. For example, a large dataset can be divided into smaller data segments or pages of data. In some cases, a dataset comprising one or more pages of data can include one or more cursor locations. Relatedly, as used herein, the term "page of data" refers to a segment or chunk of data that represents part of a dataset. In one or more embodiments, a page of data includes a cursor location. For example, each page of the page of data can include a cursor location. In some embodiments, multiple pages can separate cursor locations. For example, a cursor location can occur on a first page of the one or more pages making up the dataset and a subsequent (or new) cursor location can occur on the fourth page of the one or more pages of data making up the dataset.

Additionally, as used herein, the term "cursor location" refers to a marked location within a page of data. For example, a cursor location can be a token or unique identifier comprising a string of letters, numbers, and/or symbols at a particular position or location within the page of data. In one or more embodiments, the cursor location can indicate which data within the page of data has been processed during data ingestion. In some cases, the cursor location can indicate a point showing which files within the page of data have been either pulled and fully processed or pulled and sent to be stored in an object queue. For example, in one or more embodiments, the sync coordination system can determine the position of the cursor location based on a failure point. To illustrate, in some implementations, the sync coordination system can determine the cursor location at the failure point of a transfer run. Alternatively, the sync coordination system can determine the cursor location based on the dataset of the computer application. In some cases, the sync coordination system can update the cursor location based on the progress and/or status of the data within the page of data during the ingestion process. For example, when the sync coordination system determines that all of the data within the page of data come to a terminal state, the sync coordination system 106 can advance the cursor location to a subsequent page of the one or more pages of data making up the dataset.

As used herein, the term "failure point" refers to a location where the sync coordination system does not fully process data within a page of data during a transfer run. For example, a failure point can occur when the sync coordination system does not process and/or send an operation packet of the data within the page of data to a data pipeline for further downstream use within a transfer time limit. In one or more embodiments, the sync coordination system can set a cursor location at the failure point of the transfer run.

Moreover, as used herein, the term "object queue" refers to a database that stores data from the page of data that was not fully processed during a transfer run. In particular, the object queue can store data from the page of data that comes after the cursor location at the failure point of the transfer run. For example, the object queue can store a subset of data included in the page of data that comes after the cursor location. In some cases, the object queue can store data that encountered an error during a transformation and/or generation of an operation packet.

As used herein, the term "tracking structure" refers to a digital structure and/or software that tracks the progress of data from the page of data through the ingestion process. In some embodiments, the sync coordination system can generate and attach the tracking structure to data (e.g., sync items). In certain embodiments, the sync coordination system can monitor the progress of the data (sync items) by monitoring the progress of the tracking structure. In some embodiments, the sync coordination system can utilize the status of the tracking structure to determine and/or update the cursor location.

Additional detail regarding the sync coordination system will now be provided with reference to the figures. For example, FIG. 1 illustrates a schematic diagram of an example system environment for implementing a sync coordination system in accordance with one or more implementations. An overview of the sync coordination system is described in relation to FIG. 1. Thereafter, a more detailed description of the components and processes of the sync coordination system 106 is provided in relation to the subsequent figures.

As shown, the environment includes server(s) 102, client device 110, a third-party server 118, a database 116, and a network 114. Each of the components of the environment can communicate via the network 114, and the network 114 may be any suitable network over which computing devices can communicate. Example networks are discussed in more detail below in relation to FIGS. 6-7.

As mentioned above, the example environment includes a client device 110. The client device 110 can be one of a variety of computing devices, including a smartphone, a tablet, a smart television, a desktop computer, a laptop computer, a virtual reality device, an augmented reality device, or another computing device as described in relation to FIGS. 6-7. The client device 110 can communicate with the server(s) 102 via the network 114. For example, the client device 110 can receive user input from a user interacting with the client device 110 (e.g., via the client application 112) to, for instance, access, download or share a data from a computer application 120 within the third-party server 118, to collaborate with a co-user of a different client device, or to select a user interface element. In addition, the sync coordination system 106 on the server(s) 102 can receive information relating to various interactions with user interface elements based on the input received by the client device 110 (e.g., to transfer a dataset from the computer application 120 to the content management system 104.

As shown, the client device 110 can include a client application 112. In particular, the client application 112 may be a web application, a native application installed on the client device 110 (e.g., a mobile application, a desktop application, etc.), or a cloud-based application where all or part of the functionality is performed by the server(s) 102. Based on instructions from the client application 112, the client device 110 can present or display information, including a sync interface for presenting graphical visualizations of ingested data sets as well as interface elements for executing and monitoring the progress of the ingestion process.

As illustrated in FIG. 1, the example environment also includes the server(s) 102. The server(s) 102 may generate, track, store, process, receive, and transmit electronic data, such as digital content (e.g., content items), datasets, pages of data, prompts, interface elements, interactions with processed datasets, interactions with processed pages of data, interactions with interface elements, and/or interactions between user accounts or client devices. For example, the server(s) 102 may receive data from the client device 110 in the form of a request for transmission of a dataset from a computer application 120 external to the content management system 104 to the content management system 104. In addition, the server(s) 102 can transmit data to the client device 110 in the form of a sync interface that includes a visualization of the dataset in the content management system 104. Indeed, the server(s) 102 can communicate with the client device 110 to send and/or receive data via the network 114. In some implementations, the server(s) 102 comprise(s) a distributed server where the server(s) 102 include(s) a number of server devices distributed across the network 114 and located in different physical locations. The server(s) 102 can comprise one or more content servers, application servers, communication servers, web-hosting servers, machine learning server, and other types of servers.

As shown in FIG. 1, the server(s) 102 can also include the sync coordination system 106 as part of a content management system 104. The content management system 104 can communicate with the client device 110 to perform various functions associated with the client application 112 such as managing user accounts, managing content collections, managing content items, and facilitating user interaction with the content collections and/or content items. Indeed, the content management system 104 can include a network-based smart cloud storage system to manage, store, and maintain content items and related data across numerous user accounts, including user accounts in collaboration with one another. In some embodiments, sync coordination system 106 and/or the content management system 104 utilize a database 116 to store and access a subset of data that has not been fully processed during an ingestion process and/or data that has been fully processed during the ingestion process.

FIG. 1 further illustrates a third-party server 118. In particular, the third-party server 118 can host or house a computer application 120 that includes one or more datasets. For example, the third-party server 118 can include a server location hosting the computer application 120 that is external to the sync coordination system 106 and the content management system 104. In some cases, the third-party server 118 is external to the sync coordination system 106, but the sync coordination system 106 can nevertheless access the computer application 120 via one or more plugins, APIs, or other network-based access protocols.

Although FIG. 1 depicts the sync coordination system 106 located on the server(s) 102, in some implementations, the sync coordination system 106 may be implemented by (e.g., located entirely or in part on) one or more other components of the environment. For example, the sync coordination system 106 may be implemented by the client device 110 and/or a third-party device. For example, the client device 110 can download all or part of the sync coordination system 106 for implementation independent of, or together with, the server(s) 102.

In some implementations, though not illustrated in FIG. 1, the environment may have a different arrangement of components and/or may have a different number or set of components altogether. For example, the client device 110 may communicate directly with the sync coordination system 106 bypassing the network 114. As another example, the environment can include the database 116 located external to the server(s) 102 (e.g., in communication via the network 114) or located on the server(s) 102, on a third-party system, and/or on the client device 110.

As indicated above, in one or more embodiments, the sync coordination system 106 can ingest a dataset from an external computer application and input the dataset into a content management system. In some cases, the sync coordination system 106 can start the ingestion process by identifying user accounts of the content management system that are connected to the external computer application. In one or more embodiments, the sync coordination system 106 can shard the user accounts connected to the computer application into groups and begin the ingestion process for each user account as described below. Indeed, the ingestion process allows user accounts to transfer and store the dataset in the content management system and/or data pipeline for further downstream use.

Figure 2:
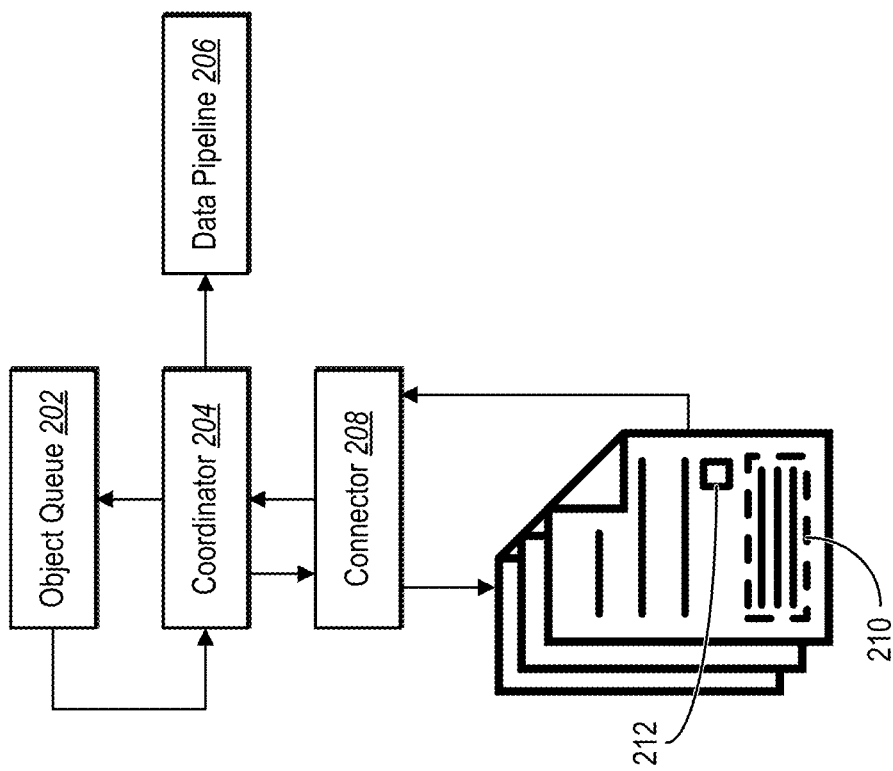
FIG. 2 illustrates an example overview of a sync coordination system updating a cursor location within a page of one or more pages of data in accordance with one or more embodiments.

As mentioned above, the sync coordination system 106 can access and ingest datasets from a computer application external to the sync coordination system 106 and/or content management system. In particular, the sync coordination system 106 can utilize a coordinator, connector(s), and/or channel(s) to ingest and track the progress of processing one or more pages of data by utilizing a cursor location within a page of the one or more pages of data. FIG. 2 illustrates an example overview of a sync coordination system updating a cursor location within a page of one or more pages of data in accordance with one or more embodiments.

As shown in FIG. 2, the sync coordination system 106 can access a page of data from one or more pages of data that make up a dataset stored in a computer application external to a content management system and the sync coordination system 106. As shown in FIG. 2, the sync coordination system 106 can utilize a coordinator 204 with computer logic to direct a connector 208 to pull the page of data from the computer application external to the content management system.

As further shown in FIG. 2, the connector 208 can pull data from the page of data until hitting a failure point during a transfer run. For example, in one or more cases, the sync coordination system 106 can set a transfer time limit threshold for ingesting and processing files, objects, and/or items in the page of data. For example, during the transfer time limit threshold, the connector 208 returns items, objects and/or files from the page of data to the coordinator 204 for further processing where the sync coordination system 106 can utilize the computer logic of the coordinator 204 to progress and/or monitor the processing of the items, objects, and/or files by invoking the transformation and generation of operation packets of the items, objects, and/or files and passing the items, objects, and/or files through one or more channels (e.g., pipelines, conduits, in-memory communication, etc.). For example, based on the sync coordination system 106 passing an item through an operations channel, the sync coordination system 106 can send the item to a data pipeline 206 for further downstream use.

As shown in FIG. 2, the sync coordination system 106 can hit the failure point when the coordinator 204 does not fully process all of the items, objects, and/or files in the page of data of the one or more pages of data within the transfer time limit threshold during a first transfer run. In one or more embodiments, when the sync coordination system 106 encounters the failure point, the connector 208 can return to the coordinator 204 the cursor location 212 at the failure point and a subset of data 210 within the page of data that was not processed during the first transfer run due to the transfer run exceeding the transfer time limit threshold.

As shown in FIG. 2, the sync coordination system 106 can determine the cursor location 212 within the page of data based on the position of the failure point. Moreover, the sync coordination system 106 can advance the cursor location to a following page of data in the one or more pages of data based on the presence of the subset of data 210 in the object queue 202 and sending the processed items, objects, and/or files to the data pipeline 206. Subsequently, the sync coordination system 106 can direct the coordinator 204 to funnel the subset of data 210 through a channel to an object queue 202.

As further show in FIG. 2, the sync coordination system 106 can cause the coordinator 204 to pull the subset of data 210 from the object queue 202 and continue the ingestion process by processing the items, objects and/or files in the subset of data 210 according to the cursor location 212 during an additional (e.g., subsequent) transfer run. Once processed, the sync coordination system 106 can cause the coordinator 204 to send the processed items, objects, and/or files of the subset of data 210 to the data pipeline 206 through a channel and advance the cursor location 212 to a following page of the one or more pages of data.

Figure 3:
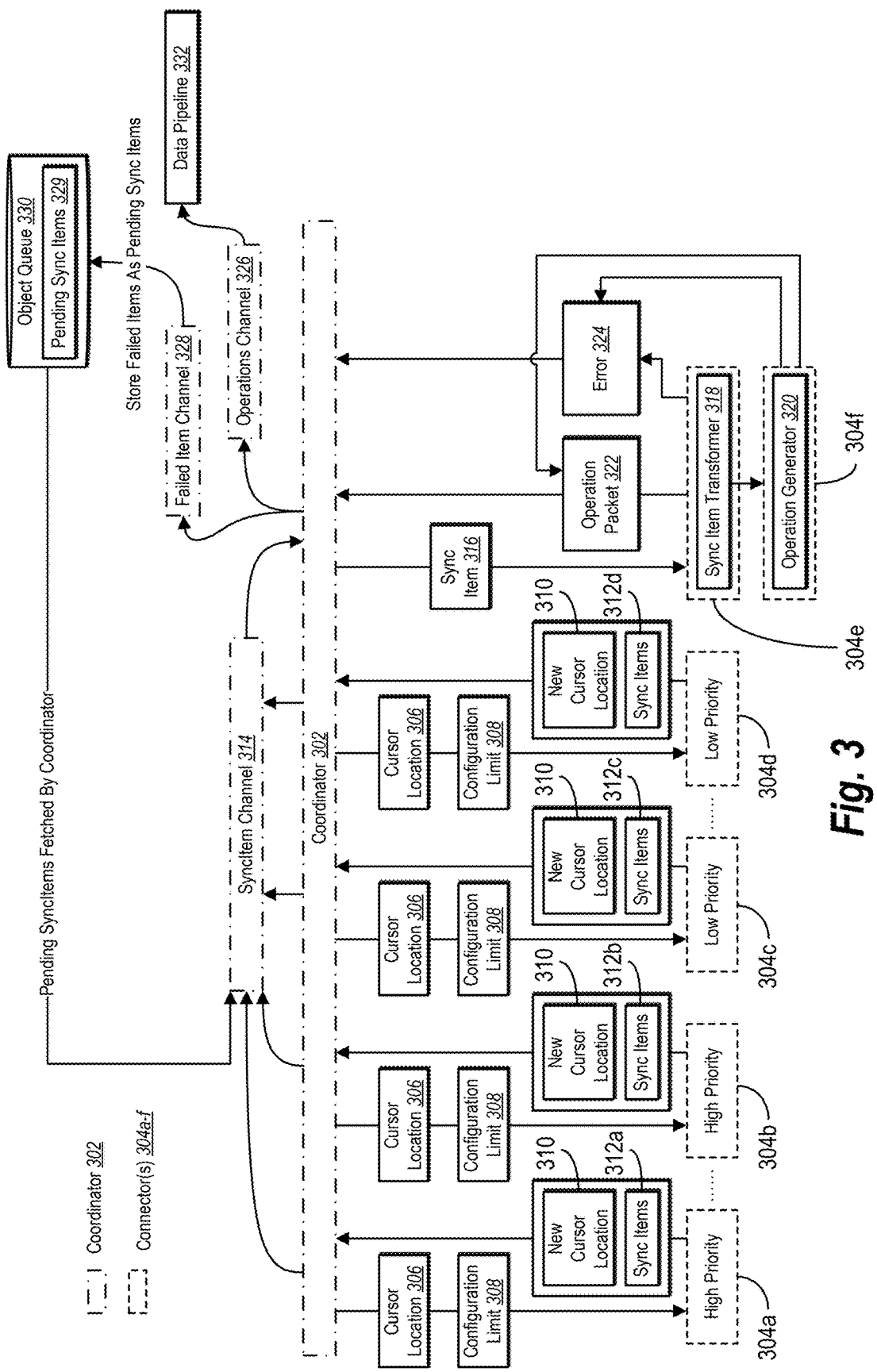
FIG. 3 illustrates a sync coordination system utilizing a coordinator, one or more connectors, and one or more channels to process a dataset comprising one or more pages of data from a computer application in accordance with one or more embodiments.

As noted above, in certain embodiments, the sync coordination system 106 can perform an ingestion process to obtain a dataset from a computer application that is external to a content management system. In particular, the sync coordination system can utilize a coordinator and one or more channels to process a dataset comprising one or more pages of data from a computer application that is external to the content management system. FIG. 3 illustrates the sync coordination system 106 causing a coordinator with computer logic and one or more connectors to pull and process one or more pages of data from a dataset by utilizing a cursor location (e.g., watermarking) and an object queue in accordance with one or more embodiments.

As discussed above, the sync coordination system 106 can cause a coordinator 302 to direct one or more connectors(s) 304a-d to pull one page of data from a dataset within a computer application that is external to the content management system. For example, in one or more embodiments the sync coordination system 106 can cause the coordinator 302 to access the dataset from the computer application by directing the connector(s) 304a-d to communicate with the computer application. In some cases, the connector(s) 304a-d can link the content management system with the computer application by communicating with an application programming interface (API) associated with the computer application. For example, in some embodiments, the sync coordination system 106 can cause the connector(s) 304a-d to pull paginated results and/or records from the API that make up the dataset. Indeed, in one or more implementations, the data set can comprise one or more pages of data from the paginated results of the API. For example, in one case the page of data can include 100 audio files. As another example, the page of data can include 100 text files. Moreover, as discussed above, the page of data can include various items, objects, and/or files.

As described above, the sync coordination system 106 simplifies the logic implemented by the connector(s) 304a-e. For example, the logic of the connectors can be simplified to include pulling one page of data and a cursor location (e.g., cursor location or new cursor location). As shown in FIG. 3, the sync coordination system 106 can cause the coordinator 302 to direct the connector(s) 304a-d to implement logic (e.g., functions) to discover the page of data and provide the cursor location within the page of data or a new cursor location of a following page of data. For example, the sync coordination system 106 can cause the coordinator 302 to invoke a function for the connector(s) 304a-d to pull the page of data. For example, the connector(s) 304a-d can implement one or more functions to pull the one page of data. As shown in FIG. 3, in some cases, the functions implemented by the connector(s) 304a-d can include a cursor location 306a-d and a configuration limit 308 (e.g., max page size). Moreover, as discussed in more detail below the connector 304e can implement logic to transform the sync items 312a-d and 316 and the pending sync items 329. Moreover, connector 304f can generate an operation packet 322 for the transformed sync items and/or the transformed pending sync items.

As just mentioned in some embodiments, the connector(s) 304a-d can implement functions to pull one page of data from a dataset. In one or more embodiments, the sync coordination system 106 can cause the(s) 304a-d to implement a sync item generator. As used herein, the term "sync item generator" refers to a function that generates sync items. In particular, the sync item generator can be a workflow comprising one or more steps that generates one or more sync items. In some embodiments, the sync item generator can also provide a new cursor location to the coordinator based on a failure point during a transfer run or communicate that the sync item generator pulled all of the data from the page of data. As indicated above, based on the simplification of the connector(s) 304a-d, in some cases, the sync item generator only makes one network request to the computer application. Relatedly, as used herein, the term "sync item" refers to intermediate data representing an item, file, and/or object of data pulled from the page of data. For example, a sync item can be metadata associated with an item, file, and/or object from the data within page of data. In one or more cases, a sync item can be a standardize object. In certain embodiments, a single sync item generator can generate multiple sync items and/or batches of sync items. Moreover, in some cases, the connector(s) 304a-d and/or sync item generators can different formats that cause the sync items 312a-d to have different formats.

As further shown in FIG. 3, the sync coordination system 106, via the coordinator 302, can cause the connector(s) 304a-d to implement multiple sync item generators that enable the connector(s) 304a-d to more quickly pull the one page of data from the computer application. In some cases, the sync coordination system 106 can prioritize the sync item 312a-d. In particular, the sync coordination system 106 can cause the coordinator 302 to instruct the sync item generators to process data from the page of data or the subset of data from the page of data based on a defined processing priority. For example, the sync coordination system 106 can define the sync items and/or pending sync items as either high priority or as low priority. For example, the sync coordination system 106 can assign a high priority for sync items of recent content generated during a first (e.g., initial) transfer run. Moreover, as shown in FIG. 3, the sync coordination system 106 can assign a low priority to the sync items of past content that is not part of recent content accessed by sync item generators. For example, the sync coordination system 106 can process sync items 312a-d and pending sync items 329 according to the following order: recent sync items, pending sync items with high priority, pending sync items with low priority, and full resync of the page of data. In one or more embodiments, the sync coordination system 106 can invoke the ingestion process of one or more pages of data based on receiving input from a client device requesting data ingestion from the third-party system. Additionally, the sync coordination system 106 can ingest and process data periodically (e.g., weekly, monthly, semi-annually). In some cases, the sync coordination system 106 can use the cursor location to ingest changes to one or more pages of data following the cursor location.

As mentioned above, the sync coordination system 106 can cause the coordinator 302 to invoke, via the connector(s) 304a-d, multiple functions (e.g., logic). In some cases, the sync coordination system 106 can cause the coordinator 302 to invoke the functions according to a certain order or priority. For example, the sync coordination system 106 can cause coordinator 302 to invoke the functions in the following order: sync item generator, sync item transformer, and operation generator. Indeed, as shown in FIG. 3 and discussed below, the sync coordination system 106 can cause the coordinator to flow the sync items 312a-d and 316 through various functions according to a predefined order. For instance, as shown in FIG. 3, the connector 304e can transform a sync item 316 by implementing a sync item transformer 318. As used herein, the term "sync item transformer" refers to a function that transforms sync items. In some cases, the sync item transformer can include a workflow comprising one or more steps for transforming a sync item. For example, in one or more embodiments, the sync item transformer 318 can transform sync items by converting and/or downloading the content of the item, file, or object associated with metadata (e.g., information that describes or relates to the data in the page of data) of the sync item 316. In one or more embodiments, transforming the sync item can include performing a sequence of steps and/or additional actions in order to download the content of the item, file, or object of the sync item. For example, transforming a sync item can include fetching permissions associated with the content of the item, file, and/or object of the sync item 316. As shown in FIG. 3, the sync coordination system 106 can transform the sync item 316 by causing the coordinator 302 to invoke the sync item transformer to download the content of the sync item 316 or fetch permissions (e.g., passwords, authorizations, login credentials) of the sync item 316.

In one or more embodiments, the sync coordination system 106 can cause the sync item transformer 318 to create one or more new cursor locations which can kickstart one or more additional workflows of the sync item generators, sync item transformers, and/or operation generators while ingesting and/or processing one or more pages of data in the data set. Indeed, the sync coordination system 106 can create a cascading effect of processing one or more pages of data by causing the sync item transformer 318 to generate new cursor locations, which in turn can generate additional sync item generators and additional sync items and/or cause the existing sync item generators to generate more sync items. In some cases, based on the additional sync items and new cursor locations, the sync coordination system 106 can transform and/or process more sync items.

As further shown in FIG. 3, the sync coordination system 106 can cause the coordinator 302 to invoke, via the connector 304f, an operation generator 320. As used herein, the term "operation generator" refers to a data standardization function that generates an operation packet for a transformed sync item. In one or more embodiments, the sync coordination system 106 causes the operation generator 320 to generate an operation packet 322 with a standardized format that allows the data pipeline to ingest content of the items, files, and/or objects from the page of data in a standardized way. As mentioned above, the sync coordination system 106 can cause the connector(s) 304a-d to define its format. Indeed, in one or more cases, various connectors can have different formatting styles. Accordingly, in one or more embodiments, each sync item generator mirrors the formatting style of its corresponding connector(s) 304a-d. In some implementations, the sync coordination system 106 can utilize the operation generator 320 to gather all of the data related to the sync item 316 and format the data in a standardize manner within the operation packet 322. Relatedly, as used herein, the term "operation packet" refers to an operation with a standardized format of data related to the sync item. In some cases, the sync coordination system 106 can cause the operation generator 320 to base the standardized formatting of the operation packet 322 based on the parameters of the data pipeline 332.

As illustrated in FIG. 3, the sync coordination system 106 can cause the coordinator 302 to send the operation packet 322 through the operations channel 326 to the data pipeline 332 for further downstream use. As indicated in FIG. 3, if the sync coordination system 106 cannot cause the coordinator 302 to invoke the operation generator 320 to form the operation packet 322, the operation generator 320 can return, via the connector 304(f), an error indicator 324 for the sync item 316 to the coordinator 302. In some cases, the sync coordination system 106 can cause the coordinator 302 to send (e.g., write) the sync item with the error indicator 324 to the object queue 330 via a failed item channel 328. In one or more embodiments, sync items stored in the object queue 330 become pending sync items 329. In some implementations, the sync coordination system 106 can process the pending sync items 329 stored in the object queue 330 in an additional transfer run by pulling the pending sync items 329 through the sync item channel 314 and transforming the pending sync items. As discussed in more detail below, when a sync item 316 either enters the object queue 330 or the data pipeline 332, that sync item enters a terminal state and the sync coordination system 106 can instruct the coordinator 302 to advance the cursor location 306 to a new cursor location 310 on a subsequent page of the one or more pages of data to continue the ingestion process of the entire dataset.

As discussed above, the sync coordination system 106 can ingest a page of data by causing the coordinator 302 to invoke multiple functions (e.g., sync item generator, sync item transformer, operation generator) for files, items, and/or objects within in the page of data. In some cases, the coordinator 302 cannot invoke all of the functions for the files, items, and/or objects within in the page of data due to the size of the page of data. For instance, as indicated above, in some cases, the page of data can be very large and include several files, items, and/or objects. In such instances, it could take an inordinate amount of time, resources, and/or memory to pull and process all of the data within the page of data during a single transfer run. In some cases, the sync coordination system 106 addresses this issue by setting a transfer time limit threshold where the connector(s) 304*a-f* has a defined period of time to pull, process, and send the files, items, and/or objects from the page of data to the data pipeline 332 during the transfer run.

As discussed above, in some cases the sync coordination system 106 does not process and/or send all of the data files, items, and/or objects from the page of data during the transfer run because the sync coordination system 106 encounters the failure point. In some cases, the sync coordination system 106 encounters the failure point when the transfer run exceeds a transfer time limit threshold. In some cases, the sync coordination system 106 can utilize the position of the failure point to determine the cursor location during a transfer run. For example, if the sync coordination system 106 does not process the page of data before the transfer time limit threshold, the sync coordination system 106 can cause the coordinator 302 to set a cursor location at the position of the failure point (e.g., the position in the page of data where the sync coordination system 106 did not process the files, items, and/or objects of the page of data because the sync coordination system 106 exceeded the transfer time limit threshold).

Alternatively, in some embodiments, the sync coordination system 106 determines the cursor location based on the cursor location provided by the computer application. For example, during a first transfer run, the sync coordination system 106 cannot initially send a cursor location to the connector(s) 304*a-d* because the sync coordination system 106 has not previously accessed the dataset from the computer application. In some embodiments, during the first transfer run, the sync coordination system 106 causes the coordinator 302 to determine the cursor location by directing the connector(s) 304*a-d* to pull the page of data and provide the cursor location within page of data to the coordinator 302. In some cases, the sync coordination system 106 fully processes a number of sync items and sends them to the data pipeline 332 where they reach a terminal state. Additionally, the sync coordination system 106, via the coordinator, can send the unprocessed sync items (e.g., subset of data) from the page of data to the object queue where they become pending sync items and also reach a terminal state. Relatedly, the sync coordination system 106 can identify the cursor location by receiving the cursor location of the page of data defined by the computer application (e.g., API) from the connector(s). In one or more implementations, with all of the sync items from the page of data reaching a terminal state, the sync coordination system 106 can cause the coordinator 302 advance the cursor location to a new cursor location on a following page of the one or more pages of data. Moreover, the sync coordination system 106 can continue the ingestion process and finish processing the pending sync items during a second transfer run by instructing the connectors to go to the page of data indicated by the cursor location and re-processing the pending sync items.

As discussed above, the sync coordination system 106 can instruct the coordinator 302 to invoke the functions (e.g., sync item generator, sync item transformer, operation generator) provided by the connector(s) 304*a-e*. In some cases, when the sync coordination system 106 causes the coordinator 302 to invoke the sync item generator, the sync item generator can return a sync item 312*a* along with a new cursor location 310 that corresponds to a following page of data in the one or more pages of data. For example, if all of the sync items from a first page of data reach a terminal status, the sync coordination system 106 via the coordinator 302 can continue to process the second page of data according to the new cursor location 310.

As discussed above, the sync coordination system 106 can encounter the failure point during the ingestion process. In one or more cases, when the sync coordination system 106 encounters the failure point, the sync coordination system 106 via the coordinator 302 and connector(s) 304*a-d* can determine and send a new cursor location. In particular, once the sync coordination system 106 completes the ingestion process for the sync items 312*a-d* and 316 in the page of data, the new cursor location indicates the location that the sync coordination system 106 should advance to when processing a subsequent page of data from the one or more pages of data.

As further shown in FIG. 3, the sync coordination system 106 can utilize the coordinator 302 to send the subset of data (e.g., pending sync items and/or metadata) from the page of data to the object queue 330 through the failed item channel 328 and determine a new cursor location 310. In a later and/or subsequent transfer run(s), the sync coordination system 106 can pick up the ingestion process and process the pending sync items 329 in the object queue 330 based on the failure point of the transfer run while using the new cursor location 310 to process a subsequent page from the one or more pages of data. The sync coordination system 106 can repeat this process until the sync coordination system 106 processes and sends all of the files, items, and/or objects in the page of data to the data pipeline 332.

To illustrate, in one or more embodiments, the page of data can include 100 files, and the sync coordination system 106 can set a transfer time limit threshold of eight minutes. To further illustrate, during the eight-minute transfer time limit threshold for the transfer run, the sync coordination system 106 can process and send 80 files of the 100 files from the page of data to the data pipeline 332. As indicated above, the sync coordination system 106 can cause the coordinator 302 to send the 20 unprocessed files through the failed item channel 328 to the object queue 330 and store the 20 unprocessed files (e.g., 20 pending sync items) in the object queue 330. Moreover, during an additional transfer run, the sync coordination system 106 can cause the coordinator 302 to continue the ingestion process, by pulling, through the sync item channel 314, the unprocessed files and transforming the unprocessed files with the sync item transformer 318. Additionally, the sync coordination system 106 can cause the coordinator 302 to invoke the operation generator 320 to generate an operation packet 322 to send through the operations channel 326 to the data pipeline 332. In alternative embodiments, the sync coordination system 106 can set the transfer time limit threshold based on the computer application and/or user account.

In some cases, the sync coordination system 106 can identify a user account associated with the content management system. In one or more cases, the sync coordination system 106 can monitor the size of datasets and the number of failure points that occur during the ingesting process for a given user. For example, in one or more embodiments, the sync coordination system 106 can identify the number of failure points during the ingestion process for a page of data. Thus, in one or more embodiments, the sync coordination system 106 can determine a transfer time limit threshold based on the number of failure points for the user account. For example, the transfer time limit for one user account could be 16 minutes while the transfer time limit for a second user account could be 30 minutes.

Moreover, as shown in FIG. 3, the sync coordination system 106 can cause the coordinator 302 to invoke multiple sync item generators from the connectors 304a-d to more quickly generate sync items 312a-d and provide a new cursor location 310 associated with sync items 312a-d to the coordinator 302. Relatedly, the sync coordination system 106 can invoke various connectors 304a-f in parallel to accurately and efficiently perform the ingestion process. For example, as described above, sync coordination system 106 causes the coordinator 302 to invoke the functions for the sync items 312a-d and 316 according to a defined priority (e.g., order). In one or more cases, the sync coordination system 106 can process the sync items (e.g., data) from the page of data in a parallel order. For instance, the sync coordination system 106 can, at the same time, cause the coordinator 302 to invoke the sync item generator for one file from the page of data while invoking the sync item transformer 318 on a different sync item 312d for a different file from the page of data.

Moreover, in one or more embodiments, the sync coordination system 106 can perform data ingestion across multiple pages of data. For example, a first page of data from the one or more pages of data can be very large and contain 700 files while the second page of data is smaller and comprises 20 files. In one or more cases, where the sync coordination system 106 processes the first page of data over multiple (e.g., two) transfer runs, the sync coordination system 106 can continue processing the second page of data. In particular, since all of the sync items from the first page of data reached a terminal status during a first transfer run, the sync coordination system 106 can cause the coordinator 302 to advance the cursor location 306 to a new cursor location 310 on the second page of data and continue ingesting the second page of data during the second transfer run while processing the pending sync items 329 from the first page of data.

Figure 4:
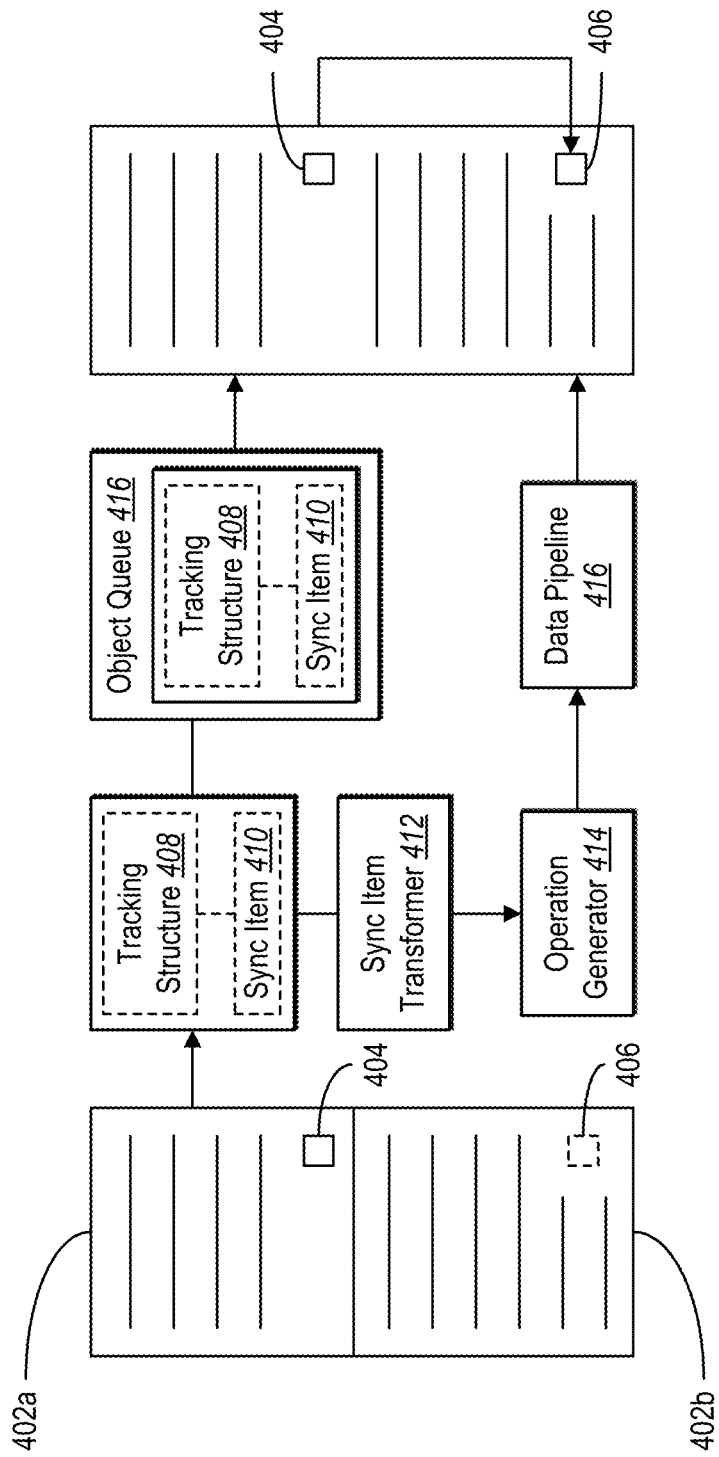
FIG. 4 illustrates a sync coordination system tracking a sync item in accordance with one or more embodiments.

As indicated above, the sync coordination system 106 can track the progress of data (e.g., sync items) from a page of data during the ingestion process. In one or more embodiments, the sync coordination system 106 can utilize a tracking structure to determine the status and/or location of the sync items. FIG. 4 illustrates the sync coordination system tracking a sync item with a tracking structure in accordance with one or more embodiments.

As shown in FIG. 4, the sync coordination system 106 can access a first page of data 402a during the ingestion process during a transfer run. As further shown in FIG. 4, a first page of data 402a can include a cursor location 404 and a second page of data 402b can include a new cursor location 406. As shown in FIG. 4, the sync coordination system 106 can update the cursor location 404 to the new cursor location 406 by utilizing a tracking structure 408.

As discussed above, the sync coordination system 106 can utilize a coordinator and a connector to retrieve a page of data. In particular, the sync coordination system 106 can cause the coordinator to invoke one or more functions provided by the connector. For example, the sync coordination system 106 can cause the coordinator to invoke a sync item generator. In some cases, the sync coordination system 106 can generate a tracking structure and associate the tracking structure 408 with the sync item generator. As shown in FIG. 4, in some cases, when the sync item generator generates a sync item 410, the sync coordination system 106 can add or attach the tracking structure to the sync item 410.

As further shown in FIG. 4, the sync coordination system 106 can track the status and/or progress of the sync item 410 by monitoring the location of the tracking structure. For example, as shown in FIG. 4, the sync coordination system 106 can determine, via the coordinator, that the sync item 410 has reached a terminal state because the sync item 410 and the tracking structure 408 are in the object queue 416.

As further indicated in FIG. 4, the sync coordination system 106 can track the status of the sync item 410 and tracing structure 408 as they pass through the sync item transformer 412 and the operation generator 414. As indicated above and further shown in FG. 4, the sync coordination system 106, via the coordinator, can send the tracking structure 408 with an operation packet for the sync item 410 to the data pipeline 418. In some instances, based on detecting sending the tracking structure 408 and the corresponding operation packet for the sync item 410, the sync coordination system 106 can determine that the sync item reached a terminal state.

As further shown in FIG. 4, in one or more embodiments, once the sync coordination system 106 determines that each sync item discovered or generated by the sync item generator reaches the terminal state either by the sync coordination system 106 storing the sync items in the object queue 416 or sending the operation run packets of the sync items to the data pipeline 418, the sync coordination system 106 can update the cursor location 404 in the first page of data 402a to a new cursor location 406 in the second page of data 402b. Indeed, identifying the terminal state of the sync items in the page of data allows the sync coordination system 106 to continue ingesting pages of data without getting hung up on processing issues or losing data.

Figure 5:
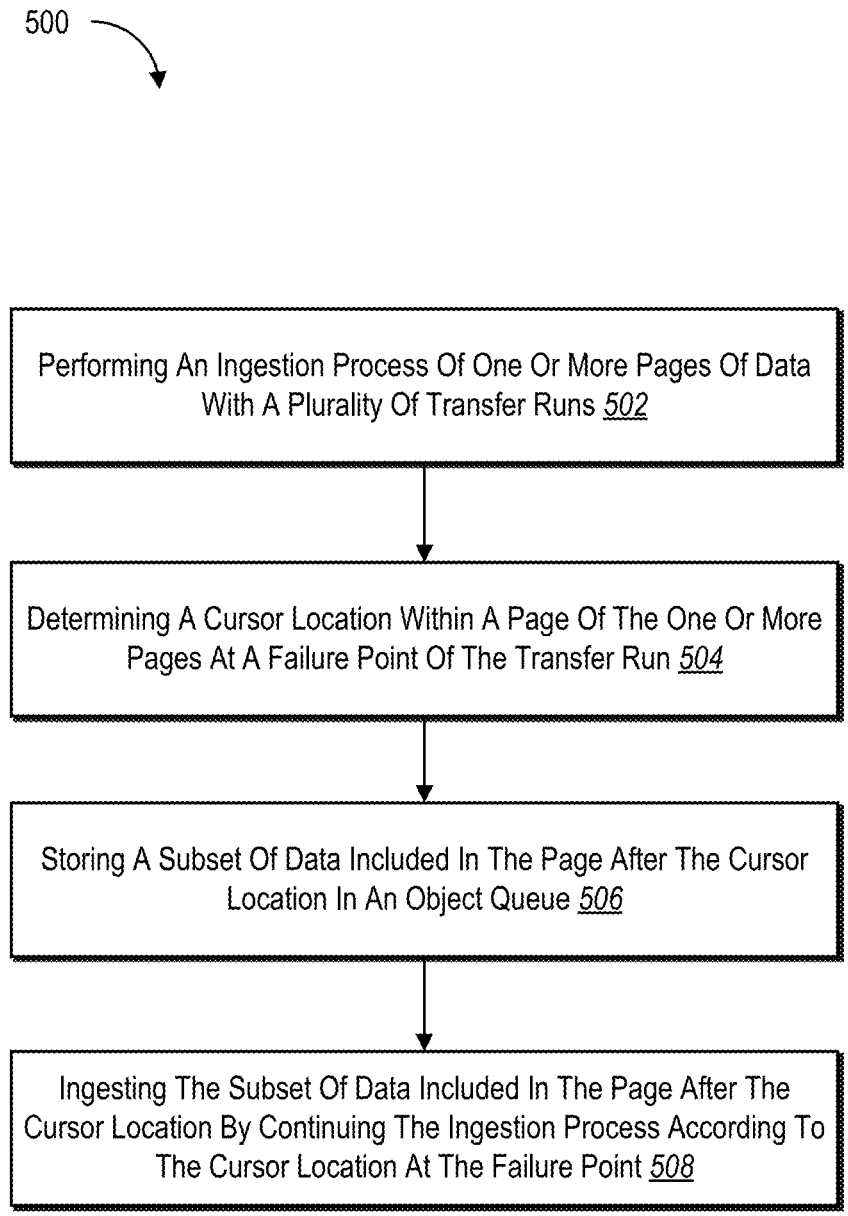
FIG. 5 illustrates a flowchart of a series of acts for ingesting a subset of data included in a page after a failure point of a transfer run indicated by a cursor location in accordance with one or more embodiments.

FIGS. 1-5, the corresponding text, and the examples provide a number of different systems and methods for processing data from a computer application utilizing a coordinator and connectors. In addition to the foregoing, implementations can also be described in terms of flowcharts comprising acts/steps in a method for accomplishing a particular result. For example, FIG. 5 illustrates a flowchart of a series of acts for ingesting a subset of data included in a page after a failure point of a transfer run indicated by a cursor location in accordance with one or more embodiments.

As illustrated in FIG. 5, the series of acts 500 may include an act 502 of performing an ingestion process of one or more pages of data with a plurality of transfer runs. For example, in one or more embodiments, the act 502 can include providing, via a connector linking a content management system to a computer application external to the content management system, an ingestion process to obtain a dataset comprising one or more pages of data from the computer application, wherein the ingestion process comprises a plurality of transfer runs. In addition, the series of acts 500 includes an act 504 of determining a cursor location within a page of the one or more pages at a failure point of the transfer run. For example, in one or more embodiments, the act 504 can include determining, utilizing a coordinator that includes computer logic to control the connector, a cursor location within a page of the one or more pages of data at a failure point of a first transfer run from among the plurality of transfer runs. In addition, the series of acts 500 includes an act 506 of storing a subset of data included in the page after the cursor location in an object queue. For instance, in some implementations, the act 506 can include storing, in an object queue, a subset of data included in the page after the cursor location. As further illustrated in FIG. 5, the series of acts 500 includes an act 508 of, ingesting the subset of data included in the page after the cursor location by continuing the ingestion process according to the cursor location at the failure point. For example, the act 508 can include ingesting, at a second transfer run from among the plurality of transfer runs, the subset of data from the page by continuing the ingestion process from the object queue according to the cursor location at the failure point of the first transfer run.

Further, in one or more embodiments, the series of acts 500 includes an act where the failure point comprises exceeding a transfer time limit threshold during the first transfer run. In addition, in one or more embodiments, the series of acts 500 includes identifying a number of failure points during the ingestion process for the page from the one or more pages of data for a user account of the content management system. Additionally, the series of acts 500 can include determining a transfer time limit threshold based on the number of failure points for the user account.

Furthermore, in one or more embodiments, the series of acts 500 includes based on the failure point, updating the cursor location within the page of the one or more pages of data to a following page of the one or more pages of data. Additionally, in one or more embodiments, the series of acts 500 includes determining completion of the ingestion process of the page from the one or more pages of data. In some cases, the series of acts 500 includes updating the cursor location to a following page of the one or more pages of data.

Moreover, in one or more embodiments, the series of acts 500 includes providing, by the connector, a sync item generator to generate sync item comprising data of the page from the one or more pages of data from the computer application. In some instances, the series of acts 500 includes transforming, the sync item by downloading the data from the page of the one or more pages of data. Additionally, in one or more embodiments, the series of acts 500 includes generating an operation packet comprising standardized formatting of the data from the sync item. In one or more embodiments, the series of acts 500 includes providing the operation packet to a data pipeline. Moreover, in one or more embodiments, the series of acts 500 includes disabling the capture of additional snapshots depicting sensitive information in response to detecting the sensitive information.

Additionally, in one or more embodiments, the series of acts 500 includes generating a tracking structure for the one or more pages of data. In some cases, the series of acts 500 includes tracking the one or more pages of data by attaching the tracking structure to the one or more pages of data during the first transfer run. Moreover, the series of acts 500 can include based on the failure point of the first transfer run, storing the subset of data and tracking structure in the object queue. In some cases, the series of acts 500 can include based on storing the tracking structure in the object queue, updating the cursor location within the page of the one or more pages of data.

Furthermore, in one or more embodiments, the series of acts 500 includes performing, via connectors linking a content management system to a computer application external to the content management system, an ingestion process to obtain a dataset comprising one or more pages of data from the computer application, wherein the ingestion process comprises a plurality of transfer runs. In addition, in one or more embodiments, the series of acts 500 includes determining, utilizing a coordinator that includes computer logic to control the connectors, a cursor location within a first page of the one or more pages of data at a first failure point of a first transfer run from among the plurality of transfer runs. Additionally, in one or more embodiments, the series of acts 500 includes storing, in an object queue, a subset of data included in the first page after the cursor location. In addition, in one or more embodiments, the series of acts 500 includes ingesting, at a second transfer run from among the plurality of transfer runs, the subset of data from the first page by continuing the ingestion process from the object queue according to the cursor location at the first failure point of the first transfer run.

Furthermore, in one or more embodiments, the series of acts 500 includes completing the ingestion process for the first page of the one or more pages of data. In addition, in one or more embodiments, the series of acts 500 includes based on completing the ingestion process for the first page of the one or more pages of data, updating the cursor location to a new cursor location on a second page of the one or more pages of data. In addition, in one or more embodiments, the series of acts 500 includes providing, via the connectors to the coordinator, a sync item generator that generates one or more sync items comprising data from the first page of the one or more pages of data. Moreover, the series of acts 500 includes providing, via the connectors to the coordinator, a sync item transformer to transform the one or more sync items by downloading the data from the first page. In one or more implementations, the series of acts 500 includes providing, via the connectors to the coordinator, an operation generator to generate an operation packet of the one or more transformed sync items that provides standardized formatting of the data from the first page.

Moreover, in one or more embodiments, the series of acts 500 includes generating one or more sync items comprising data from the first page of the one or more pages of data. In addition, in one or more embodiments, the series of acts 500 includes, assigning a processing priority to the one or more sync items. Furthermore, in one or more embodiments, the series of acts 500 includes processing the one or more sync items according to the processing priority. Moreover, in one or more embodiments, the series of acts 500 includes performing the ingestion process via one or more additional connectors linking the content management system to the computer application external to the content management system.

Additionally, in one or more embodiments, the series of acts 500 includes an act where the subset of data included in the first page of the one or more pages of data comprises metadata. Further, in one or more embodiments, the series of acts 500 includes performing, via a connector linking a content management system to a computer application external to the content management system, an ingestion process to obtain a dataset comprising one or more pages of data from the computer application, wherein the ingestion process comprises a plurality of transfer runs. Moreover, in one or more embodiments, the series of acts 500 includes determining, utilizing a coordinator that includes computer logic to control the connector, a cursor location within a page of the one or more pages of data at a failure point of a first transfer run from among the plurality of transfer runs. In some implementations, the series of acts 500 includes storing, in an object queue, a subset of data included in the page after the cursor location. In some cases, the series of acts 500 includes ingesting, at an additional transfer run from among the plurality of transfer runs, the subset of data from the page by continuing the ingestion process from the object queue according to the cursor location at the failure point of the first transfer run.

Additionally, in one or more embodiments, the series of acts 500 includes generating, utilizing a sync item generator, a sync item comprising data of the page from the one or more pages of data from the computer application. Further, in one or more embodiments, the series of acts 500 includes transforming, utilizing a sync item transformer, the sync item. Moreover, in one or more embodiments, the series of acts 500 includes generating from the transformed sync item, utilizing an operation generator, an operation packet comprising standardized formatting of the data from the sync item. In addition, in one or more embodiments, the series of acts 500 includes providing the operation packet to a data pipeline.

Moreover, in one or more embodiments, the series of acts 500 includes an act where performing, the ingestion process to obtain a dataset comprising one or more pages of data from the computer application comprises the coordinator invoking a sync item generator, a sync item transformer, and an operation generator. In addition, in one or more embodiments, the series of acts 500 includes storing, in the object queue, one or more pending sync items comprising the subset of data included in the page after the cursor location. Additionally, in one or more embodiments, the series of acts 500 includes transforming, utilizing a sync item transformer, the one or more pending sync items. Moreover, in one or more embodiments, the series of acts 500 includes generating, based on the one or more transformed pending sync items, an operation packet comprising standardized formatting of the subset of data included from the page of the one or more pages of data.

Further, in one or more embodiments, the series of acts 500 includes an act where continuing the ingestion process from the object queue according to the cursor location at the failure point of the first transfer run comprises downloading the subset of data or fetching permissions from the computer application. Additionally, in one or more embodiments, the series of acts 500 includes associating a tracking structure with the page from the one or more pages of data. Moreover, in one or more embodiments, the series of acts 500 includes tracking the page from the one or more pages of data, by attaching the tracking structure to the page from the one or more pages of data. In addition, in one or more embodiments, the series of acts 500 includes based on storing the tracking structure in the object queue, updating the cursor location within the page of the one or more pages of data.

In one or more implementations, each of the components of the sync coordination system 106 are in communication with one another using any suitable communication technologies. Additionally, the components of the sync coordination system 106 can be in communication with one or more other devices including one or more client devices described above. It will be recognized that in as much the sync coordination system 106 is shown to be separate in the above description, any of the subcomponents may be combined into fewer components, such as into a single component, or divided into more components as may serve a particular implementation.

Figure 6:
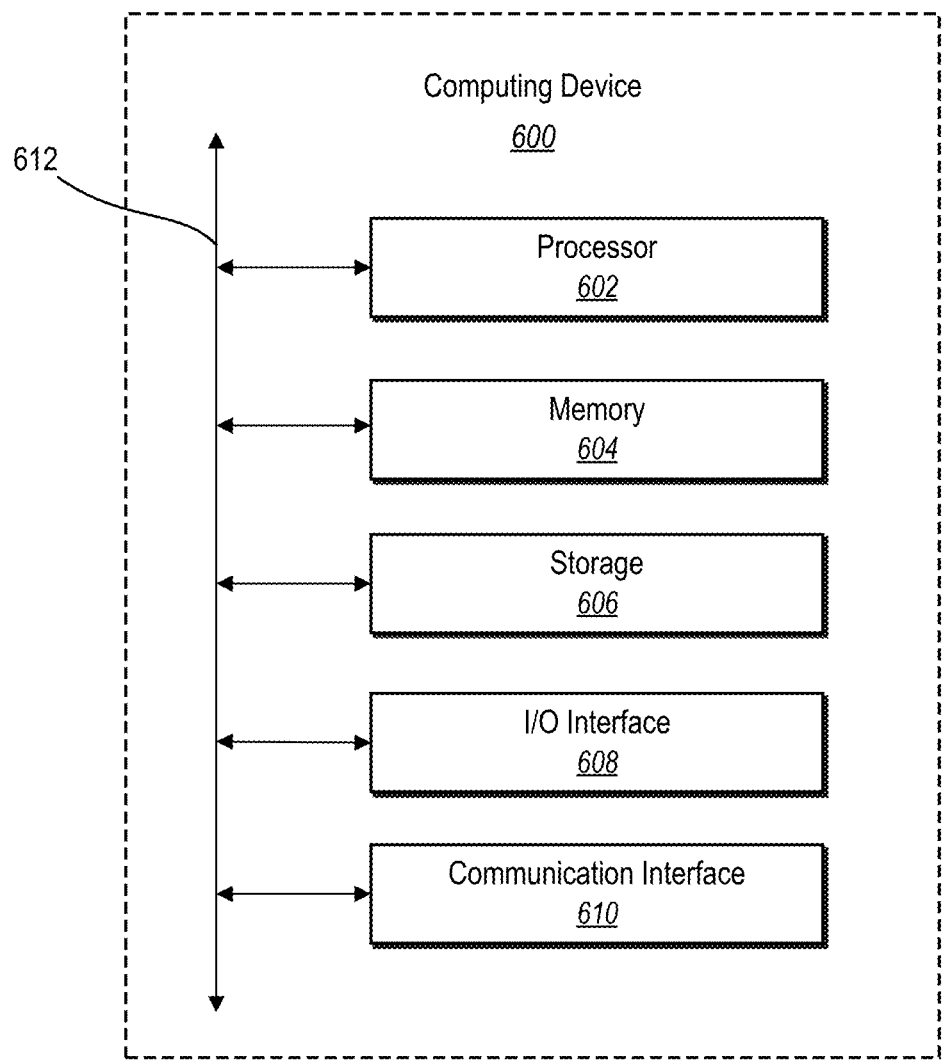
FIG. 6 illustrates a block diagram of an exemplary computing device in accordance with one or more embodiments.

FIG. 6 illustrates a block diagram of exemplary computing device 600 that may be configured to perform one or more of the processes described above. The components of the sync coordination system 106 can include software, hardware, or both. For example, the components of the sync coordination system 106 can include one or more instructions stored on a computer-readable storage medium and executable by processors of one or more computing devices (e.g., the computing device 600). When executed by the one or more processors, the computer-executable instructions of the sync coordination system 106 can cause the computing device 600 to perform the methods described herein. Alternatively, the components of the sync coordination system 106 can comprise hardware, such as a special purpose processing device to perform a certain function or group of functions. Additionally, or alternatively, the components of the sync coordination system 106 can include a combination of computer-executable instructions and hardware.

Furthermore, the components of the sync coordination system 106 performing the functions described herein may, for example, be implemented as part of a stand-alone application, as a module of an application, as a plug-in for applications including content management applications, as a library function or functions that may be called by other applications, and/or as a cloud-computing model. Thus, the components of the sync coordination system 106 may be implemented as part of a stand-alone application on a personal computing device or a mobile device.

Implementations of the present disclosure may comprise or utilize a special purpose or general-purpose computer including computer hardware, such as, for example, one or more processors and system memory, as discussed in greater detail below. Implementations within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, implementations of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some implementations, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Implementations of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

As mentioned, FIG. 6 illustrates a block diagram of exemplary computing device 600 that may be configured to perform one or more of the processes described above. One will appreciate that third-party server(s) 102, the client device(s) 110, and/or the computing device 600 may comprise one or more computing devices such as computing device 600. As shown by FIG. 6, computing device 600 can comprise processor 602, memory 604, a storage device, a I/O interface, and communication interface 610, which may be communicatively coupled by way of communication infrastructure 612. While an exemplary computing device 600 is shown in FIG. 6, the components illustrated in FIG. 6 are not intended to be limiting. Additional or alternative components may be used in other implementations. Furthermore, in certain implementations, computing device 600 can include fewer components than those shown in FIG. 6. Components of computing device 600 shown in FIG. 6 will now be described in additional detail.

In particular implementations, processor 602 includes hardware for executing instructions, such as those making up a computer program. As an example, and not by way of limitation, to execute instructions, processor 602 may retrieve (or fetch) the instructions from an internal register, an internal cache, memory 604, or storage device 606 and decode and execute them. In particular implementations, processor 602 may include one or more internal caches for data, instructions, or addresses. As an example, and not by way of limitation, processor 602 may include one or more instruction caches, one or more data caches, and one or more translation lookaside buffers (TLBs). Instructions in the instruction caches may be copies of instructions in memory 604 or storage device 606.

Memory 604 may be used for storing data, metadata, and programs for execution by the processor(s). Memory 604 may include one or more of volatile and non-volatile memories, such as Random Access Memory ("RAM"), Read Only Memory ("ROM"), a solid-state disk ("SSD"), Flash, Phase Change Memory ("PCM"), or other types of data storage. Memory 604 may be internal or distributed memory.

Storage device 606 includes storage for storing data or instructions. As an example, and not by way of limitation, storage device 606 can comprise a non-transitory storage medium described above. Storage device 606 may include a hard disk drive (HDD), a floppy disk drive, flash memory, an optical disc, a magneto-optical disc, magnetic tape, or a Universal Serial Bus (USB) drive or a combination of two or more of these. Storage device 606 may include removable or non-removable (or fixed) media, where appropriate. Storage device 606 may be internal or external to computing device 600. In particular implementations, storage device 606 is non-volatile, solid-state memory. In other implementations, Storage device 606 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

I/O interface 608 allows a user to provide input to, receive output from, and otherwise transfer data to and receive data from computing device 600. I/O interface 608 may include a mouse, a keypad or a keyboard, a touch screen, a camera, an optical scanner, network interface, modem, other known I/O devices or a combination of such I/O interfaces. I/O interface 608 may include one or more devices for presenting output to a user, including, but not limited to, a graphics engine, a display (e.g., a display screen), one or more output drivers (e.g., display drivers), one or more audio speakers, and one or more audio drivers. In certain implementations, I/O interface 608 is configured to provide graphical data to a display for presentation to a user. The graphical data may be representative of one or more graphical interfaces and/or any other graphical content as may serve a particular implementation.

Communication interface 610 can include hardware, software, or both. In any event, communication interface 610 can provide one or more interfaces for communication (such as, for example, packet-based communication) between computing device 600 and one or more other computing devices or networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI.

Additionally or alternatively, communication interface 610 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, communication interface 610 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, communication interface 610 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

Communication infrastructure 612 may include hardware, software, or both that couples components of computing device 600 to each other. As an example and not by way of limitation, communication infrastructure 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

Figure 7:
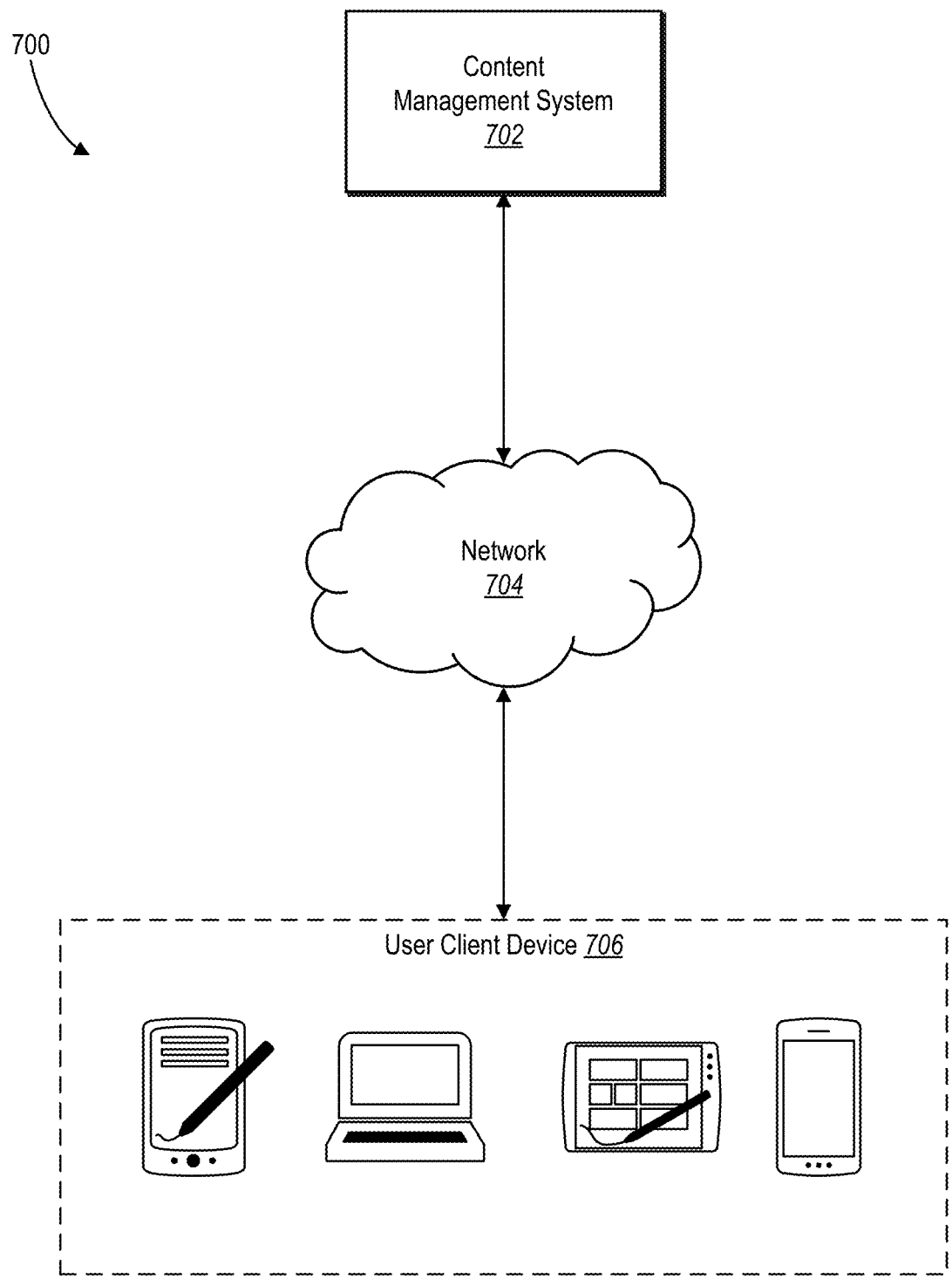
FIG. 7 illustrates a networking environment of a sync coordination system in accordance with one or more embodiments.

FIG. 7 is a schematic diagram illustrating environment 700 within which one or more implementations of the sync coordination system 106 can be implemented. As discussed above with respect to FIG. 1, in some embodiments the sync coordination system 106 can be part of content management system 702. In such cases, the content management system 702 may generate, store, manage, receive, and send digital content (such as digital videos). For example, content management system 702 may send and receive digital content to and from the user client device 706 by way of network 704. In particular, the content management system 702 can store and manage a collection of digital content. The content management system 702 can manage the sharing of digital content between computing devices associated with a plurality of users. For instance, the content management system 702 can facilitate a user sharing a digital content with another user of content management system 702.

In particular, the content management system 702 can manage synchronizing digital content across multiple of the user client device 706 associated with one or more users. For example, a user may edit digital content using user client device 706. The content management system 702 can cause user client device 706 to send the edited digital content to content management system 702. Content management system 702 then synchronizes the edited digital content on one or more additional computing devices.

In addition to synchronizing digital content across multiple devices, one or more implementations of content management system 702 can provide an efficient storage option for users that have large collections of digital content. For example, content management system 702 can store a collection of digital content on content management system 702, while the user client device 706 only stores reduced-sized versions of the digital content. A user can navigate and browse the reduced-sized versions (e.g., a thumbnail of a digital image) of the digital content on user client device 706. In particular, one way in which a user can experience digital content is to browse the reduced-sized versions of the digital content on user client device 706.

Another way in which a user can experience digital content is to select a reduced-size version of digital content to request the full- or high-resolution version of digital content from content management system 702. In particular, upon a user selecting a reduced-sized version of digital content, user client device 706 sends a request to content management system 702 requesting the digital content associated with the reduced-sized version of the digital content. Content management system 702 can respond to the request by sending the digital content to user client device 706. User client device 706, upon receiving the digital content, can then present the digital content to the user. In this way, a user can have access to large collections of digital content while minimizing the amount of resources used on user client device 706.

User client device 706 may be a desktop computer, a laptop computer, a tablet computer, a personal digital assistant (PDA), an in- or out-of-car navigation system, a handheld device, a smart phone or other cellular or mobile phone, or a mobile gaming device, other mobile device, or other suitable computing devices. User client device 706 may execute one or more client applications, such as a web browser (e.g., Microsoft Windows Internet Explorer, Mozilla Firefox, Apple Safari, Google Chrome, Opera, etc.) or a native or special-purpose client application (e.g., Dropbox Paper for iPhone or iPad, Dropbox Paper for Android, etc.), to access and view content over network 704.

Network 704 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which user client devices 706 may access content management system 702.

In the foregoing specification, the present disclosure has been described with reference to specific exemplary implementations thereof. Various implementations and aspects of the present disclosure(s) are described with reference to details discussed herein, and the accompanying drawings illustrate the various implementations. The description above and drawings are illustrative of the disclosure and are not to be construed as limiting the disclosure. Numerous specific details are described to provide a thorough understanding of various implementations of the present disclosure.

The present disclosure may be embodied in other specific forms without departing from its spirit or essential characteristics. The described implementations are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

The foregoing specification is described with reference to specific exemplary implementations thereof. Various implementations and aspects of the disclosure are described with reference to details discussed herein, and the accompanying drawings illustrate the various implementations. The description above and drawings are illustrative and are not to be construed as limiting. Numerous specific details are described to provide a thorough understanding of various implementations.

The additional or alternative implementations may be embodied in other specific forms without departing from its spirit or essential characteristics. The described implementations are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A computer-implemented method comprising:
    performing for a user account, via a connector linking a content management system to a computer application external to the content management system, an ingestion process to obtain a dataset comprising one or more pages of data from the computer application, wherein the ingestion process comprises a plurality of transfer runs;
    determining, utilizing a coordinator that includes computer logic to control the connector, a cursor location within a page of the one or more pages of data at a failure point of a first transfer run from among the plurality of transfer runs, wherein the failure point corresponds to exceeding a transfer time limit threshold based on the user account;
    storing, in an object queue, a subset of data included in the page after the cursor location; and
    ingesting, at a second transfer run from among the plurality of transfer runs, the subset of data from the page by continuing the ingestion process from the object queue according to the cursor location at the failure point of the first transfer run.

2. The computer-implemented method of claim 1, further comprising determining, a first transfer time limit threshold for a first user account that differs from a second transfer time limit threshold for a second user account.

3. The computer-implemented method of claim 1 further comprising:
    identifying a number of failure points during the ingestion process for the page from the one or more pages of data for a user account of the content management system; and
    determining a transfer time limit threshold based on the number of failure points for the user account.

4. The computer-implemented method of claim 1, further comprising:
    based on the failure point, updating the cursor location within the page of the one or more pages of data to a following page of the one or more pages of data.

5. The computer-implemented method of claim 1, further comprising:
    determining completion of the ingestion process of the page from the one or more pages of data; and
    updating the cursor location to a following page of the one or more pages of data.

6. The computer-implemented method of claim 1, further comprising:
    providing, by the connector, a sync item generator to generate a sync item comprising data of the page from the one or more pages of data from the computer application;
    transforming the sync item by downloading the data from the page of the one or more pages of data;

generating an operation packet comprising standardized formatting of the data from the sync item; and providing the operation packet to a data pipeline.

7. The computer-implemented method of claim 1, further comprising:

generating a tracking structure for the one or more pages of data;

tracking the one or more pages of data by attaching the tracking structure to the one or more pages of data during the first transfer run;

based on the failure point of the first transfer run, storing the subset of data and tracking structure in the object queue; and based on storing the tracking structure in the object queue, updating the cursor location within the page of the one or more pages of data.

8. The computer-implemented method of claim 1, wherein the connector retrieves one page of data from the one or more pages of data and a new cursor location.

9. A non-transitory computer readable medium comprising instructions that, when executed by at least one processor, cause the at least one processor to:

perform for a user account, via connectors linking a content management system to a computer application external to the content management system, an ingestion process to obtain a dataset comprising one or more pages of data from the computer application, wherein the ingestion process comprises a plurality of transfer runs;

determine, utilizing a coordinator that includes computer logic to control the connectors, a cursor location within a first page of the one or more pages of data at a first failure point of a first transfer run from among the plurality of transfer runs, wherein the first failure point corresponds to exceeding a transfer time limit threshold based on the user account;

store, in an object queue, a subset of data included in the first page after the cursor location; and ingest, at a second transfer run from among the plurality of transfer runs, the subset of data from the first page by continuing the ingestion process from the object queue according to the cursor location at the first failure point of the first transfer run.

10. The non-transitory computer readable medium of claim 9, further comprising instructions that, when executed by the at least one processor, cause the at least one processor to:

complete the ingestion process for the first page of the one or more pages of data; and based on completing the ingestion process for the first page of the one or more pages of data, update the cursor location to a new cursor location on a second page of the one or more pages of data.

11. The non-transitory computer readable medium of claim 9, further comprising instructions that, when executed by the at least one processor, cause the at least one processor to:

provide, via the connectors to the coordinator, a sync item generator that generates one or more sync items comprising data from the first page of the one or more pages of data;

provide, via the connectors to the coordinator, a sync item transformer to transform the one or more sync items by downloading the data from the first page; and provide, via the connectors to the coordinator, an operation generator to generate an operation packet of the one or more transformed sync items that provides standardized formatting of the data from the first page.

12. The non-transitory computer readable medium of claim 9, further comprising instructions that, when executed by the at least one processor, cause the at least one processor to:

generate one or more sync items comprising data from the first page of the one or more pages of data;

assign a processing priority to the one or more sync items; and process the one or more sync items according to the processing priority.

13. The non-transitory computer readable medium of claim 9, further comprising instructions that, when executed by the at least one processor, cause the at least one processor to:

perform the ingestion process via one or more additional connectors linking the content management system to the computer application external to the content management system.

14. The non-transitory computer readable medium of claim 9, wherein the subset of data included in the first page of the one or more pages of data comprises metadata.

15. A system comprising:

at least one processor; and a non-transitory computer readable medium comprising instructions that, when executed by the at least one processor, cause the system to:

perform for a user account, via a connector linking a content management system to a computer application external to the content management system, an ingestion process to obtain a dataset comprising one or more pages of data from the computer application, wherein the ingestion process comprises a plurality of transfer runs;

determine, utilizing a coordinator that includes computer logic to control the connector, a cursor location within a page of the one or more pages of data at a failure point of a first transfer run from among the plurality of transfer runs, wherein the failure point corresponds to exceeding a transfer time limit threshold based on the user account;

store, in an object queue, a subset of data included in the page after the cursor location; and ingest, at an additional transfer run from among the plurality of transfer runs, the subset of data from the page by continuing the ingestion process from the object queue according to the cursor location at the failure point of the first transfer run.

16. The system of claim 15, further comprising instructions that, when executed by the at least one processor, cause the system to:

generate, utilizing a sync item generator, a sync item comprising data of the page from the one or more pages of data from the computer application;

transform, utilizing a sync item transformer, the sync item;

generate from the transformed sync item, utilizing an operation generator, an operation packet comprising standardized formatting of the data from the sync item; and provide the operation packet to a data pipeline.

17. The system of claim 15, wherein performing, the ingestion process to obtain a dataset comprising one or more pages of data from the computer application comprises the coordinator invoking a sync item generator, a sync item transformer, and an operation generator.

18. The system of claim 15, further comprising instructions that, when executed by the at least one processor, cause the system to:
- store, in the object queue, one or more pending sync items comprising the subset of data included in the page after the cursor location;
- transform, utilizing a sync item transformer, the one or more pending sync items; and
- generate, based on the one or more transformed pending sync items, an operation packet comprising standardized formatting of the subset of data included from the page of the one or more pages of data.

19. The system of claim 15, wherein continuing the ingestion process from the object queue according to the cursor location at the failure point of the first transfer run comprises downloading the subset of data or fetching permissions from the computer application.

20. The system of claim 15, further comprising instructions that, when executed by the at least one processor, cause the system to:
- associate a tracking structure with the page from the one or more pages of data;
- track the page from the one or more pages of data, by attaching the tracking structure to the page from the one or more pages of data; and
- based on storing the tracking structure in the object queue, update the cursor location within the page of the one or more pages of data.

\* \* \* \* \*